Figures 1, 2:
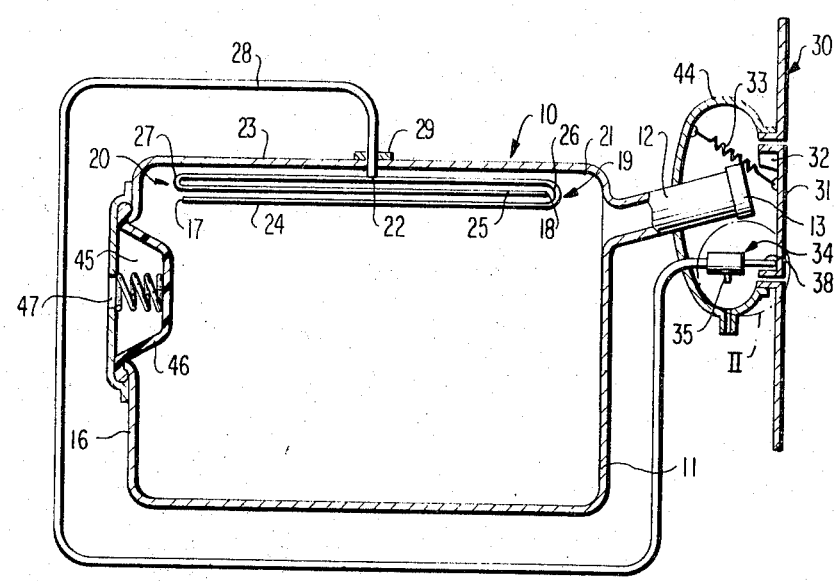

United States Patent [19]
Andres

[11] 3,749,124
[45] July 31, 1973

[54] INSTALLATION FOR THE VENTING OF A FUEL TANK OF A VEHICLE

[75] Inventor: Rudolf Andres, Sindelfingen, Germany

[73] Assignee: Daimler-Benz Aktiengesellchaft, Stuttgart-Unterturkheim, Germany

[22] Filed: Sept. 20, 1971

[21] Appl. No.: 181,810

[30] Foreign Application Priority Data
Sept. 22, 1970 Germany............... P 20 46 562.7

[52] U.S. Cl. .............................................. 137/587
[51] Int. Cl. ............................................ F16k 45/00
[58] Field of Search............... 137/587, 589, 588, 137/583; 141/285

[56] References Cited
UNITED STATES PATENTS

| | | | |
|---|---|---|---|
| 3,060,962 | 10/1962 | Graves............................... | 137/587 |
| 1,792,827 | 2/1931 | Farkas............................... | 137/587 |
| 3,643,690 | 2/1972 | Sarai.................................. | 137/587 |
| 3,144,056 | 8/1964 | Mosher.............................. | 137/587 |
| 3,149,642 | 9/1964 | Marx............................... | 137/587 X |

Primary Examiner—Samuel Scott
Assistant Examiner—Ira S. Lazarus
Attorney—Craig, Antonelli and Hill

[57] ABSTRACT

A vent system for venting fuel tanks of a motor vehicle in which a vent valve is connected with the interior space of the tank within an upper central area of the tank whereby the valve actuating member cooperates with a tank lid closing off the filler pipe of the fuel tank against visibility from the outside in such a manner that the interior space of the tank is closed off in the normal position of the tank lid whereas it is connected with the atmosphere upon opening of the tank lid.

16 Claims, 2 Drawing Figures

Patented July 31, 1973

3,749,124

INVENTOR
RUDOLF ANDRES

BY Craig, Antonelli & Hill
ATTORNEYS

INSTALLATION FOR THE VENTING OF A FUEL TANK OF A VEHICLE

The present invention relates to an installation for venting the fuel tank of a vehicle. The aim underlying the present invention resides in so constructing such an installation that the fuel tank is forcibly vented during or prior to the opening of the filler pipe connection so that no fuel can be forced outwardly by the internal pressure of the tank. The problems underlying this aim are solved according to the present invention in that a vent valve is connected with the interior space of the tank at a place located in a central upper area of the tank, and in that the valve actuating member cooperates with a movable tank lid covering the filler pipe of the fuel tank against visibility from the outside in such a manner that the interior space of the tank is closed in the rest position of the tank lid but is connected with the atmosphere upon opening of the tank lid.

By the connection according to the present invention of the vent valve to a central upper area of the tank interior space, it is achieved additionally beyond the desired purpose that also during the opening of the tank lid, no fuel can escape toward the outside through the vent valve when the vehicle is in an inclined position.

The vent valve can be constructed in a simple manner as automatically responsive excess-pressure-valve in that the closure spring of the tank lid is matched to a critical interior pressure of the fuel tank so that the tank lid is opened by interior pressures lying above the critical value and the interior space of the tank is thereby connected with the atmosphere.

In order to be able to actuate the vent valve directly by the tank lid, provision is made according to a further feature of the present invention that the vent valve is arranged within the area of a wall recess or wall indentation for the filler pipe connection and is connected with the interior space of the tank by a vent line.

An installation with two vent lines within the fuel tank with a so-called return of the fuel without external collecting vessel has already been proposed. In application of the present invention to this type of installation, it is proposed that the vent valve is connected to the two line sections, of which each is extended from its inlet opening in the tank interior space toward an opposite tank end and from the latter to the joint with the other line section disposed close to the tank upper portion.

Accordingly, it is an object of the present invention to provide an installation for venting fuel tanks of vehicles which avoids by simple means the aforementioned drawbacks encountered in the prior art.

Another object of the present invention resides in a vent system for fuel tanks of motor vehicles which precludes internal tank pressures from forcing fuel toward the outside when opening the tank filler pipe.

A further object of the present invention resides in an installation for venting fuel tanks of motor vehicles which is simple in construction and utilizes relatively few simple parts even though it provides a fully automatic operation that is extraordinarily reliable.

Still another object of the present invention resides in an installation for venting fuel tanks of the type described above in which a fuel tank is automatically vented into the atmosphere in case of internal pressures above a critical pressure.

These and further objects, features and advantages of the present invention will become more apparent from the following description when taken in connection with the accompanying drawing which shows for purposes of illustration only one embodiment of an installation for venting the fuel tank of a motor vehicle, and wherein:

FIG. 1 is a schematic longitudinal cross-sectional view through the rear portion of a motor vehicle with the essential details of a fuel tank venting system according to the present invention, and FIG. 2 is a partial cross-sectional view, on an enlarged scale, illustrating the details encircled by the circle II of the arrangement of FIG. 1.

Referring now to the drawing wherein like reference numerals are used throughout the two views to designate like parts, the fuel tank generally designated by reference numeral 10 (FIG. 1) is provided with a filler pipe connection 12 which projects into a wall recess 44 of the rear wall cover panel generally designated by reference numeral 30 and is closed off by a screw cover 13. The wall recess 44 and therewith the filler pipe 12 are closed off against visibility from the outside by a tank lid 31 which is pivotally secured about a horizontal cross axis by means of a conventional bearing arrangement 32 at the rear wall panel 30. The tank lid 31 is retained in its indicated rest position by a closure spring 33 anchored at the wall indentation 44.

A combined venting and pressure relief valve 34 arranged in the wall indentation 44 is connected with the tank interior space 21 by means of a vent line 28 to be described more fully hereinafter and is provided with a discharge connection 35 terminating in the atmosphere as well as with a line connection 36 for the vent line 28. (FIG. 2).

The valve cylinder 37 (FIG. 2) of the valve generally designated by reference numeral 34 is subdivided into two valve chambers 40 and 41 by a lip seal 39 displaceable by means of a plunger 38, whereby the two chambers 40 and 41 are connected with each other when the lip seal 39 passes over the overflow channels 42 provided in the valve cylinder 37.

A connection of the valve chambers 40 and 41 can also take place under the influence of an excess pressure in the chamber 40 by inverting the lip seal 39 (pressure relief function).

A valve spring 43 retains the plunger 38 in abutment at the tank lid 31 so that during opening or pivotal movement of the tank lid 31 directed away from the valve cylinder 37, the lip seal 39 is displaced by means of the spring 43 into the area of the overflow channels 42 and thus a connection is established between the valve connections 35 and 36.

The spring constant of the closure spring 33 is matched to a predetermined internal pressure in the tank interior space 21 so that with larger internal pressures in the valve chamber 40, the plunger 38 together with the tank lid 31 is displaced in the opening direction and the tank interior space 21 is automatically relieved.

The described automatic pressure relief of the tank by means of an actuation of the tank lid 31 serves the purpose to reduce with certainty also slight pressures in the tank interior space 21 prior to filling the tank with gasoline by way of the filler pipe 12. The danger is avoided thereby that fuel present in the filler pipe 12 is forced outwards during opening of the closure means 13.

The vent line 28 extends through an opening 29 (FIG. 1) of the tank ceiling wall 23 and is connected by a joint 22 at a central upper place of the tank interior space 21 with two vent lines generally designated by reference numerals 19 and 20. Whereas the inlet opening 17 of the vent line 19 is disposed close to the forward tank end 16, the inlet opening 18 of the vent line 20 is arranged in the area of the rear tank end 11.

Each of the vent lines 19 and 20 is provided between its inlet opening 17 and 18 and the junction 22 with a line section 24 and 25, which extends from its respective inlet opening toward the opposite tank end to the line elbow 26 and 27, and from the latter toward the joint 22. As a result thereof, in inclined positions of the fuel tank 10, in which the inlet openings 17 and 18 are disposed at different heights, a return of the fuel forced up into one line section 24 or 25, by way of the junction 22 and the other line section back into the tank is achieved so that no collecting vessel for the escaped fuel has to be provided on the outside of the tank.

For the equalization of changes in the volume of the fuel, the fuel tank 10 is provided with an equalization space 45 which is separated in a fluid tight manner by a movable diaphragm 46 with respect to the tank interior space 21 and is in free communication with the atmosphere by way of a cover aperture 47.

While I have shown and described only one embodiment in accordance with the present invention, it is understood that the same is not limited thereto but is susceptible of numerous changes and modifications as known to those skilled in the art and I, therefore, do not wish to be limited to the details shown and described herein but intend to cover all such changes and modifications as are encompassed by the scope of the appended claims.

What I claim is:

1. An installation for venting a fuel tank of a motor vehicle, characterized by a vent valve means connected with the interior space of the tank, said valve means including an actuating member cooperating with a movable tank lid means externally covering a filler pipe of the fuel tank in such a manner that the tank interior space, in the normal position of the tank lid means, is substantially closed off but is connected with the atmosphere upon opening of the tank lid means.

2. An installation according to claim 1, characterized in that said vent valve means is connected with the interior space of the tank at a place located in a central, upper area of the tank.

3. An installation according to claim 1, characterized in that a closure spring means for the tank lid means is matched to a critical internal pressure of the fuel tank so that the tank lid means is opened by internal pressures in the tank above the critical value and the interior space of the tank is thereby connected with the atmosphere.

4. An installation according to claim 3, characterized in that the valve means is arranged within the area of a wall recess for the filler pipe and is connected with the interior space of the tank by way of a vent line.

5. An installation according to claim 4, characterized in that the valve means is connected with two vent line sections disposed on the inside of the tank, of which each line section extends from its respective inlet opening toward the opposite tank end and from there extends back toward a more centrally located junction means with the other line section.

6. An installation according to claim 5, characterized in that said junction means is located close to the tank upper part.

7. An installation according to claim 5, characterized in that the valve actuating member is a plunger abutting at the tank lid means.

8. An installation according to claim 6, characterized in that the junction means is located close to the center of the tank ceiling.

9. An installation according to claim 6, characterized in that each line section extends at least over the major length of the tank from its inlet opening near one end toward a respective opposite end.

10. An installation according to claim 9, characterized in that said vent valve means is connected with the interior space of the tank at a place located in a central, upper area of the tank.

11. An installation according to claim 9, characterized in that the junction means is located close to the center of the tank ceiling.

12. An installation according to claim 11, characterized in that the valve actuating member is a plunger abutting at the tank lid means.

13. An installation according to claim 1, characterized in that the valve means is arranged within the area of a wall recess for the filler pipe and is connected with the interior space of the tank by way of a vent line.

14. An installation according to claim 1, characterized in that the valve means is connected with two vent line sections disposed on the inside of the tank, of which each line section extends from its respective inlet opening toward the opposite tank end and from there extends back toward a more centrally located junction means with the other line section.

15. An installation according to claim 14, characterized in that said junction means is located close to the tank upper part.

16. An installation according to claim 14, characterized in that each line section extends at least over the major length of the tank from its inlet opening near one end toward a respective opposite end.

* * * * *